UNITED STATES PATENT OFFICE.

JOHN CHILCOTT, OF BROOKLYN, NEW YORK.

IMPROVED COMPOSITION FOR LUTING GAS-RETORTS.

Specification forming part of Letters Patent No. 43,970, dated August 30, 1864; antedated August 24, 1864.

*To all whom it may concern:*

Be it known that I, JOHN CHILCOTT, of the city of Brooklyn, in the county of Kings and State of New York, have invented a new and useful Improvement in Luting Materials for Gas and other Retorts and for other Purposes; and I do hereby declare that the following is a full, clear, and exact description of the same.

The material commonly used for luting gas-retorts consists either of loam or clay or a mortar made of the refuse lime from the purifiers, and after having been once used is useless, and has to be carted away at considerable expense. As large quantities are required, a considerable saving of expense can be effected by rendering it fit to be used over again.

The object of my invention is to effect this saving; and to this end it consists in taking the luting material which has been used, grinding or otherwise reducing it to a plastic state with a suitable quantity of water, and adding fresh clay and graphite in suitable proportions. For the loam or clay luting I add a small quantity of lime, but for the lime-luting this addition is not necessary.

The proportions of clay and graphite which I have found to produce the best results have been eight (8) parts, by weight, of the latter to ninety (90) of the former; and when lime is added for the loam or clay luting two (2) parts, by weight, will be sufficient for the above-mentioned quantities of the clay and graphite. I prefer a clay which contains magnesia.

In the use of a loam or clay luting it is not necessary to add the clay, lime, and graphite for the first time of using; but after it has been once used I take the luting, and for every twenty (20) parts, by weight, add one (1) part of a mixture of fresh clay, powdered graphite, and lime in the above-specified proportions, or corresponding quantities of those materials unmixed, place them in a pug-mill or other suitable apparatus with a suitable quantity of water, and mix and knead them together into a paste of sufficient consistency to be used as luting. The luting thus prepared, after having been once used, may be again reduced in the same way with a suitable quantity of water, and used without any further addition of clay, graphite, and lime, and such reduction and use may be sometimes repeated twice or more times without any further addition but water; but when it is found to lose its tenacity or cohesiveness about half the above-specified quantities of fresh clay, graphite, and lime are added before its reduction to the paste or plastic state, and this addition may be repeated in smaller quantities whenever, as will be determined by practice, its tenacity or cohesiveness is insufficient, and in this way the same luting may be used a great number of times.

In the use of a luting made from the refuse lime of the purifiers I add before the first time of using a mixture of fresh clay and powdered graphite in the above-specified proportions, or corresponding quantities of those materials unmixed, to every four parts, by weight, of lime, and mix and knead the whole well together with a sufficient quantity of water to make a paste of suitable consistency for the purpose of luting. This luting material, by being pulverized and kneaded up again with water, after having been used, may be again used one or more times without any further addition of clay and graphite; but as soon as it begins to lose its tenacity or cohesiveness about half the above-specified quantities of clay and graphite are added, after pulverizing and before kneading, and smaller quantities may be added whenever its tenacity or cohesiveness is becoming insufficient, and in this way the use of the same luting may be repeated many times, and until, as will be determined by experience, it is desirable to make a new luting.

I do not confine myself to the use of the proportions of the several materials herein specified, as these may be varied to some extent without materially affecting the result; but

What I claim as my invention, and desire to secure by Letters Patent, is—

The addition to the loam, clay, or lime luting, used for luting gas or other retorts or other purposes, of fresh clay and graphite, either with or without a small quantity of lime, whereby it is rendered capable of being used repeatedly, substantially as herein specified.

JOHN CHILCOTT.

Witnesses:
CHAS. E. FROST,
HIPPOLYTE MAL.